United States Patent [19]
Murray et al.

[11] Patent Number: 5,842,313
[45] Date of Patent: Dec. 1, 1998

[54] COMMUNICATIONS CABLE INTERCONNECTION APPARATUS AND ASSOCIATED METHOD FOR AN OPEN OFFICE ARCHITECTURE

[75] Inventors: Richard A. Murray; Victor E. Murray, both of Longwood, Fla.

[73] Assignee: American Access Technologies, Inc., Altamonte Springs, Fla.

[21] Appl. No.: 785,006

[22] Filed: Jan. 17, 1997

Related U.S. Application Data

[63] Continuation-in-part of Ser. No. 719,419, Sep. 24, 1996.
[51] Int. Cl.⁶ .................................................. E04C 2/52
[52] U.S. Cl. .................... 52/220.6; 52/220.8; 52/506.09; 52/506.06; 52/127.8; 174/48; 312/242; 312/245; 312/223.6; 312/321.5
[58] Field of Search ............................... 52/270.1, 220.6, 52/220.8, 506.04, 506.06, 506.09, 321.5, 127.7, 127.8; 312/242, 245, 223.6, 223.1; 174/48, 49, 52.1, 52.5, 53

[56] References Cited

U.S. PATENT DOCUMENTS

| | | | |
|---|---|---|---|
| 3,131,512 | 5/1964 | MacLeod, Jr. | .............................. 50/127 |
| 3,359,695 | 12/1967 | Gazerro . | |
| 4,060,294 | 11/1977 | Haworth et al. . | |
| 4,237,663 | 12/1980 | Storer . | |
| 4,372,629 | 2/1983 | Propst et al. . | |
| 4,592,602 | 6/1986 | Kuster et al. . | |
| 4,679,867 | 7/1987 | Heldenbrand et al. . | |
| 4,686,381 | 8/1987 | Boteler et al. . | |
| 4,702,535 | 10/1987 | Beun | ....................................... 312/308 |
| 4,738,054 | 4/1988 | Muth et al. . | |
| 4,890,318 | 12/1989 | Crane et al. . | |
| 4,916,862 | 4/1990 | Storer . | |
| 4,922,668 | 5/1990 | Payne . | |
| 4,967,041 | 10/1990 | Bowman . | |
| 4,984,982 | 1/1991 | Brownlie et al. . | |
| 5,008,491 | 4/1991 | Bowman | ..................................... 174/48 |
| 5,082,336 | 1/1992 | Munch et al. . | |
| 5,231,562 | 7/1993 | Pierce et al. . | |
| 5,329,865 | 7/1994 | McWard . | |
| 5,407,261 | 4/1995 | Mercer . | |
| 5,435,641 | 7/1995 | Dumon Dupuis et al. . | |
| 5,573,321 | 11/1996 | Ben, Jr. | ................................... 312/242 |
| 5,574,251 | 11/1996 | Sevier . | |
| 5,575,668 | 11/1996 | Timmerman . | |
| 5,595,028 | 1/1997 | Handzlik . | |

FOREIGN PATENT DOCUMENTS 2690287  10/1993  European Pat. Off. .

*Primary Examiner*—Christopher Kent
*Assistant Examiner*—Yvonne Horton-Richardson
*Attorney, Agent, or Firm*—Allen, Dyer, Doppelt, Milbrath & Gilchrist, P.A.

[57] ABSTRACT

Communications cable is routed within horizontal pathways between the structural ceiling and drop ceiling to a fire-resistant cabinet mounted between the ceilings. Communication cable switching and termination equipment is carried by the cabinet for providing a consolidation point and cross-connect location for both copper wire and optical fiber cables serving work stations within an open office architecture. The cabinet includes an access door opening into a room below the drop ceiling for providing user access to the equipment. The door lies within the drop ceiling plane when in the closed position. A removable equipment mounting plate is carried by the cabinet for lowering the equipment below the drop ceiling when the door is in the open position. Cabinet fire-resistant side wall penetrations permits the communications cable routed between the ceilings to enter and exit the cabinet for connection with the communications cable switching and termination equipment. With the use of the cabinet, the amount of communication cable required to service work stations in an open office architecture is greatly reduced.

51 Claims, 13 Drawing Sheets

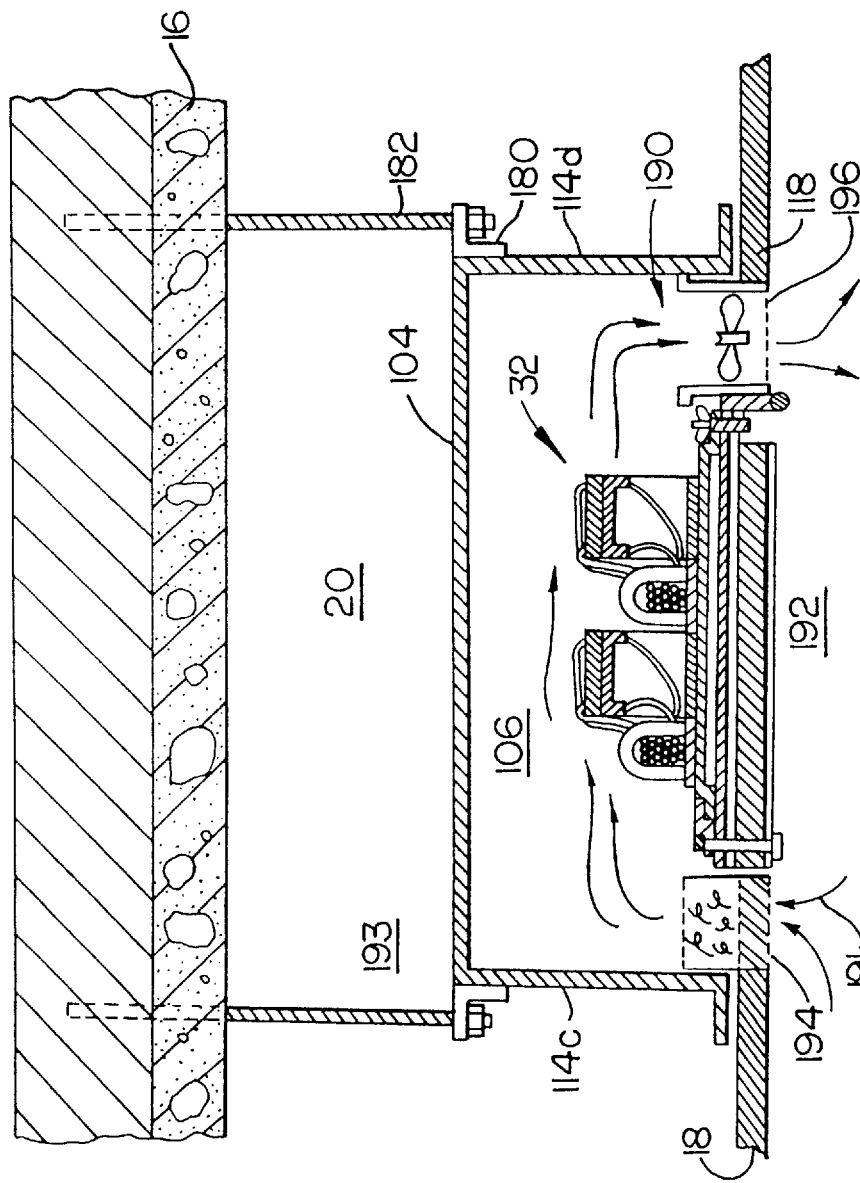

COMMUNICATIONS CABLE INTERCONNECTION APPARATUS AND ASSOCIATED METHOD FOR AN OPEN OFFICE ARCHITECTURE

CROSS REFERENCE TO RELATED APPLICATION

This application is a continuation-in-part of application Ser. No. 08/719,419 filed Sep. 24, 1996 for "Zone Cabling Termination Cabinet," commonly assigned with the present invention.

BACKGROUND OF INVENTION

1. Field of Invention

The present invention relates generally to the routing and distribution of low voltage cabling within a building, and more particularly to the routing of communications cable, including voice, data, and video to a consolidation point through horizontal cable runs for user access to the cable proximate user work stations.

2. Description of Background Art

The concept of an open office and open office architecture has become accepted practice in many businesses and in many countries. Open office architecture permits communication cable to be routed from its entry into a building through risers vertically to wiring closets on multiple floors, horizontally to a distribution point within a work area, and ultimately to user work stations.

Heretofore in the telecommunications industry, in order to provide telephone or networking service to a plurality of customers in a building, a centralized location has been designated which is customarily called a main distribution frame (MDF). The MDF is typically a common room, closet or wall of a room, set aside for the routing of all of the communication cables for all of the work stations of different entities and users in all of the offices or tenant spaces in the building. The MDF and intermediate distribution frame (IDF) must be located away from electrical power connections in order to avoid electro-magnetic interference with communications transmission. Vertical cables, sometimes referred to as "backbone cables", provide continuity from the MDF to each IDF located with the riser shaft. The IDFs are sometimes referred to as telecommunications closets (TCs). Each work station with communications capability added or changed requires new lengths of cable to be led to and from the centralized IDF, often involving lengthy and circuitous routing, thus extensive amounts of cable are required. The space required for the IDF can be sizable, and it lessens the amount of floor space available for other uses by which leasing income from tenants could be earned. Another disadvantage of IDFs is that they are necessarily accessible by all tenants of the building, resulting in little or no security from meddling therewith.

In addition, when office churn rates are considered, recabling becomes a major factor in the cost of an office relocation. With the extended use of voice, data, and video equipment, and thus cable, in a typical office environment, the open office architecture has all but become a necessity for major businesses. Open office cabling permits efficient and cost effective recabling. A user network of data connections can be made to be accessible at many locations and installed by the user, thus eliminating such an expense from the office building owner.

With such open office architecture, comes the extensive use of cabling systems which include "consolidation points." The consolidation point includes a location for interconnection between horizontal cables that extend from building pathways and horizontal cables that extend into work area pathways, as defined by the Telecommunications Industry Association (TIA). Further, the "consolidation point" offers transition from permanent horizontal cabling to flexible open office cabling. Also defined by the TIA is the multi-user telecommunications outlet assembly which is a grouping in one location of several telecommunication outlets/connectors.

The telecommunications industry, rapidly advancing technology, and user demands have created the need to provide efficient and cost effective systems, devices, and method useful by the user for providing access to communications cable from the work stations. Such is the motivation behind the present invention.

SUMMARY OF INVENTION

In view of the foregoing background, it is therefore an object of this invention to provide a system and method for decentralizing cable termination and switching to smaller user-defined zones located in close proximity to the work stations served. Such will thereby eliminate or diminish the need for centralized IDFs, decrease the amount of wiring or other cable required for each work station, and provide security by isolating user systems and eliminating general access by others. Further, rentable floor space will be made available by utilizing plenum space between a true ceiling and a suspended false ceiling of tiles, or between a false floor and a structural floor. The objects of this invention are achieved by providing a consolidation point with the capacity to handle multiple work stations. Further, by providing a system that includes, by way of example, a recessed fire-resistant metallic enclosure within the ceiling tile grid above each work station, it is easier to maintain, change, add or replace communications connections, to move the point or wiring connections closer to the work station, thereby reducing the extent of disruption of work activities and the huge amount of wire running back and forth throughout a building, which heretofore has been required to install or make any changes to a communications system. In addition, reception generally improves with the shortening the cabling.

This and other objects, advantages and features of the present invention are provided by an apparatus for interconnection of communications cables useful with an open office architecture in a building, the apparatus comprising a horizontally extending, generally planar support structure and a generally planar partition vertically spaced from the support structure forming a chamber therebetween wherein a housing is adapted for recessed installation within the chamber. The housing includes walls defining a housing enclosed interior space with an opening within one wall. The housing further includes an access door hingedly attached thereto and moveable between an open position and a closed position relative to the opening within the housing one wall. Means are provided for mounting the housing in a recessed installation within the chamber, wherein the housing one wall is generally co-planar with the planar partition for accessing the housing enclosed interior space from outside the chamber formed by the support structure and the partition. Means carried by the housing are also provided for supporting communications cable termination and switching equipment. The supporting means positions the equipment within the housing enclosed interior space when the door is in the closed position and permits positioning of the equipment outside of the enclosed interior space when the door is in the open position, thus permitting servicing of the equipment. Means are provided for penetrating the housing wall positioned within the chamber. The penetrating means is adapted for entry and exit of a communications cable passing to and from the equipment. A communications cable extends generally horizontally within the chamber and is received by the penetration means for electrical connection of the cable with the equipment.

In a preferred embodiment, a cabinet is provided which is made of fire-resistant metal. The cabinet creates a non-plenum enclosed space, close to the work station it serves. In a preferred use, it is recessed into a plenum space above a suspended ceiling and houses cable connections and switching, without the need to use high-cost plenum fire-rated materials. The cabinet has an equipment mounting plate removably mounted on a removable access panel, which when closed is flush with the bottom wall of the cabinet, which in turn is flush with the suspended false ceiling. In a preferred embodiment, the exposed lower surface of the panel is clad with ceiling tile material. The utility thereof being two-fold: the cladding gives the cabinet an acceptable fire rating; and visually it blends with the rest of the ceiling, is inconspicuous and not readily detected by the unsuspecting eye, thus providing some measure of security from unauthorized meddling. The access panel, in a preferred embodiment, is a hinged door opening to a vertical position into the environmentally controlled work space for service. An equipment mounting plate on the interior surface of the door is easily removed therefrom for making necessary changes at a workbench or table top. Cables enter and exit the cabinet through fire-rated penetration in opposing side walls of the cabinet. The cabinet facilitates the decentralization of cable terminations and switching for location in secure user-defined zones of a building close to the work stations served thereby, thus eliminating the need for large, centralized and in secure IDFs.

A method aspect of the invention is for routing communications cable and for providing cable junctions for multiple work stations within a building having a structural ceiling and a drop ceiling below the structural ceiling. The method comprises the steps of providing a plurality of fire-resistant housings wherein each housing is dimensioned to fit between the structural and drop ceilings. Each housing has a bottom panel which opens to permit access to an interior space within the housing. The method further includes the steps of mounting cable termination means within the housing and mounting each housing between the structural ceiling and the drop ceiling for permitting access to the housing bottom panel from below the drop ceiling. Communication cable is then routed to each enclosure.

BRIEF DESCRIPTION OF DRAWINGS

A preferred embodiment of the invention as well as alternate embodiments are described by way of example with reference to the accompanying drawings in which:

FIG. 14 is a vertical section taken along the line 14—14 of FIG. 13 with the access panel in a closed position.

DETAILED DESCRIPTION OF PREFERRED EMBODIMENT

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
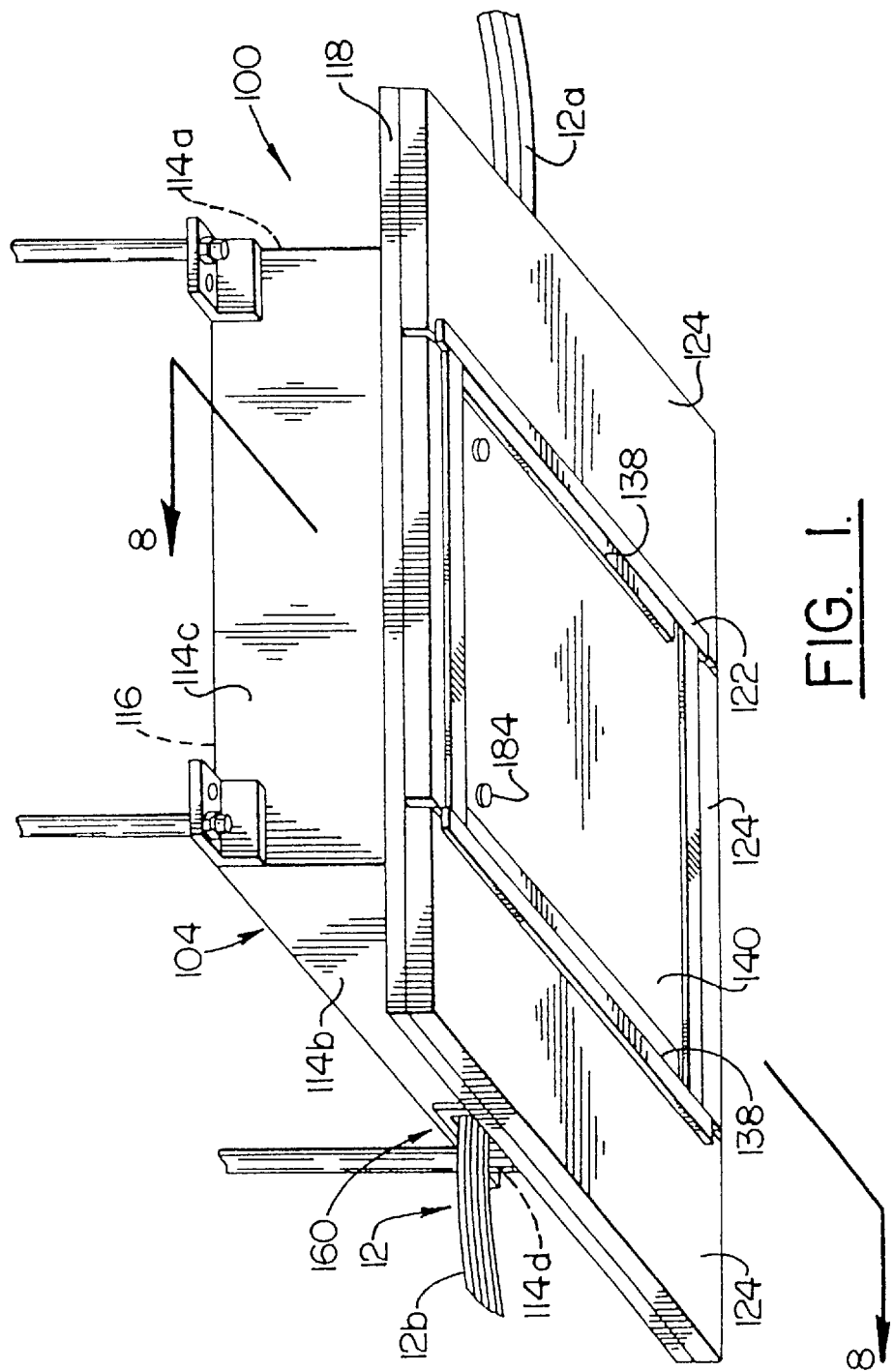
FIG. 1 is a perspective view of one embodiment of the present invention, a telecommunications cable interconnection cabinet, from below showing an access panel and surrounding bottom wall faced with ceiling tile, and cabling entering and exiting the invention.
Figure 2:
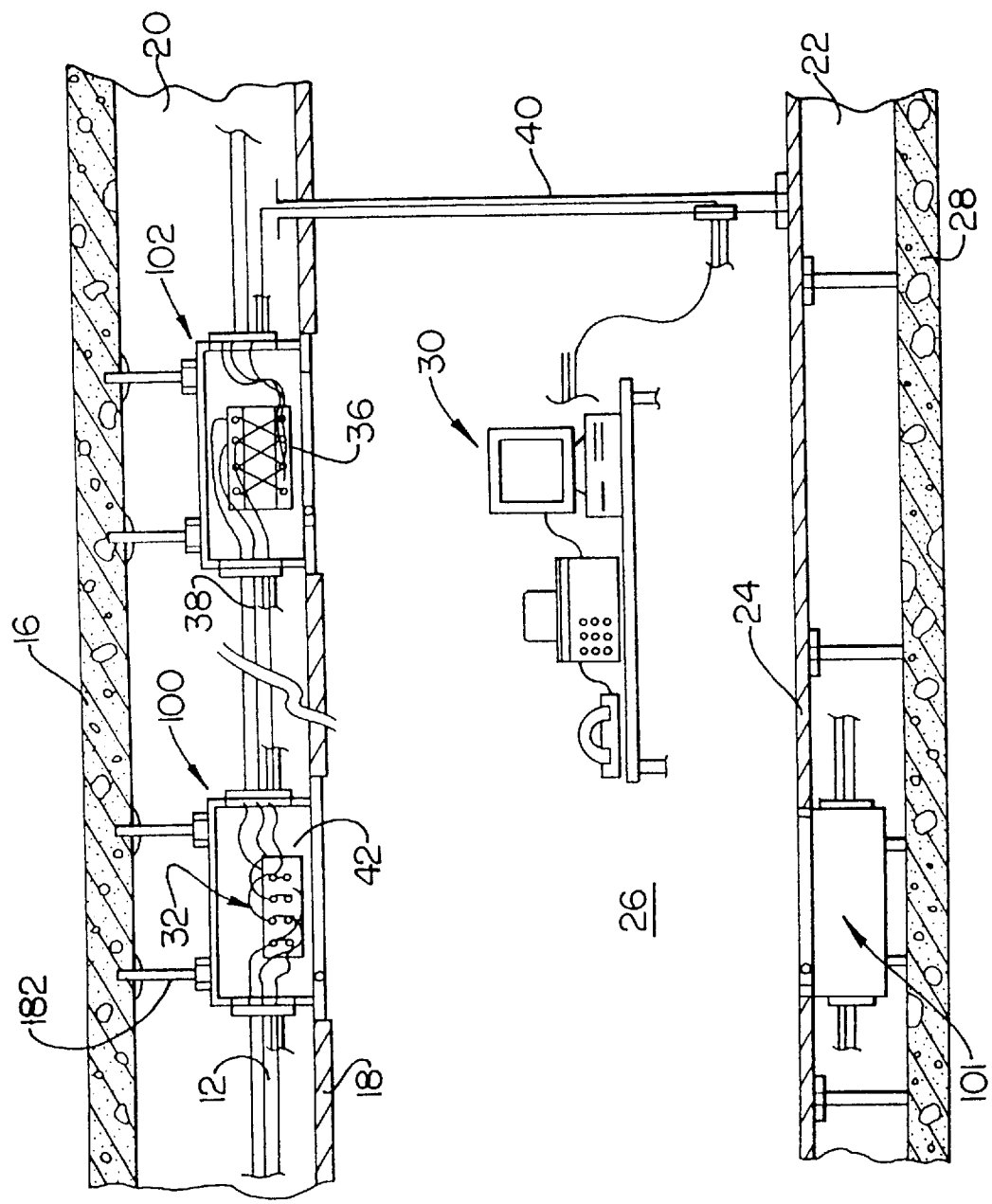
FIG. 2 is a partial cross-sectional view of a building floor illustrating one preferred use of the present invention with a professional office environment.

Referring initially to FIG. 1, a cabling termination cabinet 100 for interconnection of communications cables 12 useful with work stations 14 in an open office architecture, as illustrated with reference to FIG. 2. By way of example, the cabinet 100 is adapted for installation between a horizontally extending, generally planar support structure, such as a support ceiling 16 and a generally planar partition, such as a drop ceiling 18, vertically spaced from the support ceiling 16 so as to form a plenum area or chamber 20 therebetween. Again with reference to FIG. 2, in an alternate use, the cabinet 100 is mounted within the space 22 between a raised floor 24 for a room 26 formed above a structural floor 28 and below the drop ceiling 18. Typically, unlike the chamber 20 and the space 22, the room 26 will have a different and controlled environment for supporting work station human factors and use of electrical components 30 such a computer, facsimile/modem, and telephone which represents voice, data and video signal use common in an open office environment to which the present invention seeks to satisfy associated needs herein described, by way of example.

One preferred embodiment of the present invention includes the cabinet 100 adapted to be installed between the support ceiling 16 and the drop ceiling 18, and it will be this structure that is herein described in detail. However, it will be easily understood how such a structure can be adapted for use between the raised floor 24 and structural floor 28 as illustrated again with reference the cabinet 101 of FIG. 2. Further, as will be herein described, various types of communications cable termination/switching equipment 32 will be carried by the cabinet 100 including, by way of example, a cross-connection 34 for a multi-user telecommunications outlet 36 within the cabinet 102, thus facilitating termination of a cable 38 routed to the cabinet 102 through a building horizontal pathway or chamber 20. The multi-user outlet 36 provides access to user telecommunications components 30 through cable runs including well known drops 40. Further, as illustrated again with reference to FIG. 2, the cabinet 100 will include multiple connectors 42 for providing a consolidation point for the communications cable 12 routed from a building pathway through the chamber 20 to various work stations 45 as illustrated with reference to FIGS. 3 and 4.

As is well known in to communications installation field, as illustrated again with reference to FIG. 3, cables 44 are fed the a building 46 from a local exchange carrier 48 typically remotely located from the building 46. The cable 44 is typically routed to a main distribution frame (MDF) 50 located in a basement or ground floor of the building 46. Cable 52 is then routed from the MDF 50 to intermediate distribution frames (IDF) 54 on each building floor 56. Depending on the building floor space, cable 58 is routed from the IDF 54 on each floor 56 to a telecommunications closet (TC) 60 on that floor. It is to be understood that by referring to a cable, reference is made to multiple cables as is typically routed, including copper wire as well as optical fiber. Typically, a switch and patch panel used as a consolidation point are mounted within the TC 60 from which multiple cables 62 are then routed to the work stations 45. Typically the cable 52 may represent by way of example, 96 cable for 96 drops. If any moves, adds, and changes (MAC) are needed, the cost are relatively high, $1.50 per cable per foot in the current market.

Figure 3:
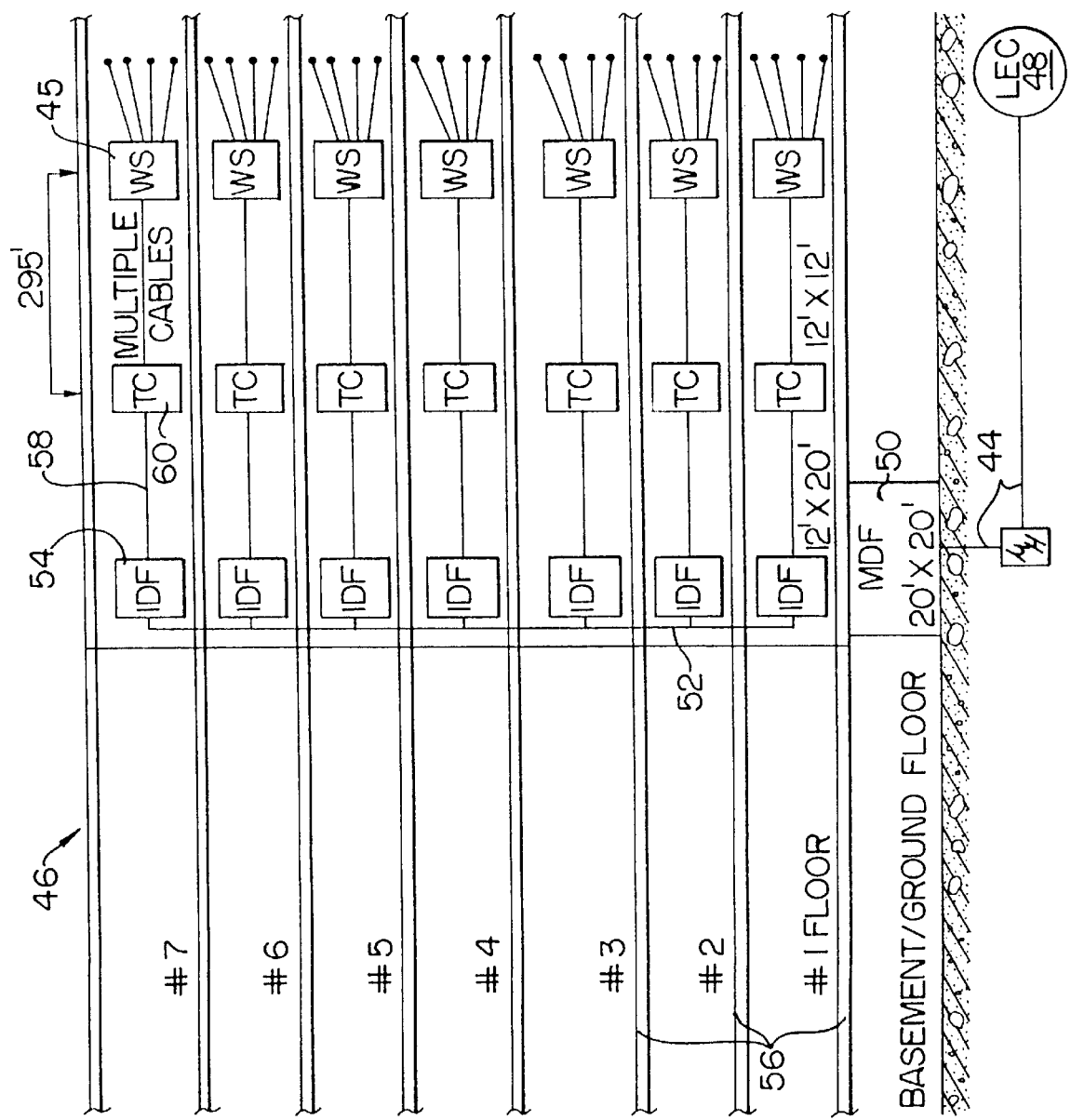
FIG. 3 is a diagrammatical elevational view of a building in cross-section illustrating a typical telecommunications cable and equipment distribution system known in the art.
Figure 4:
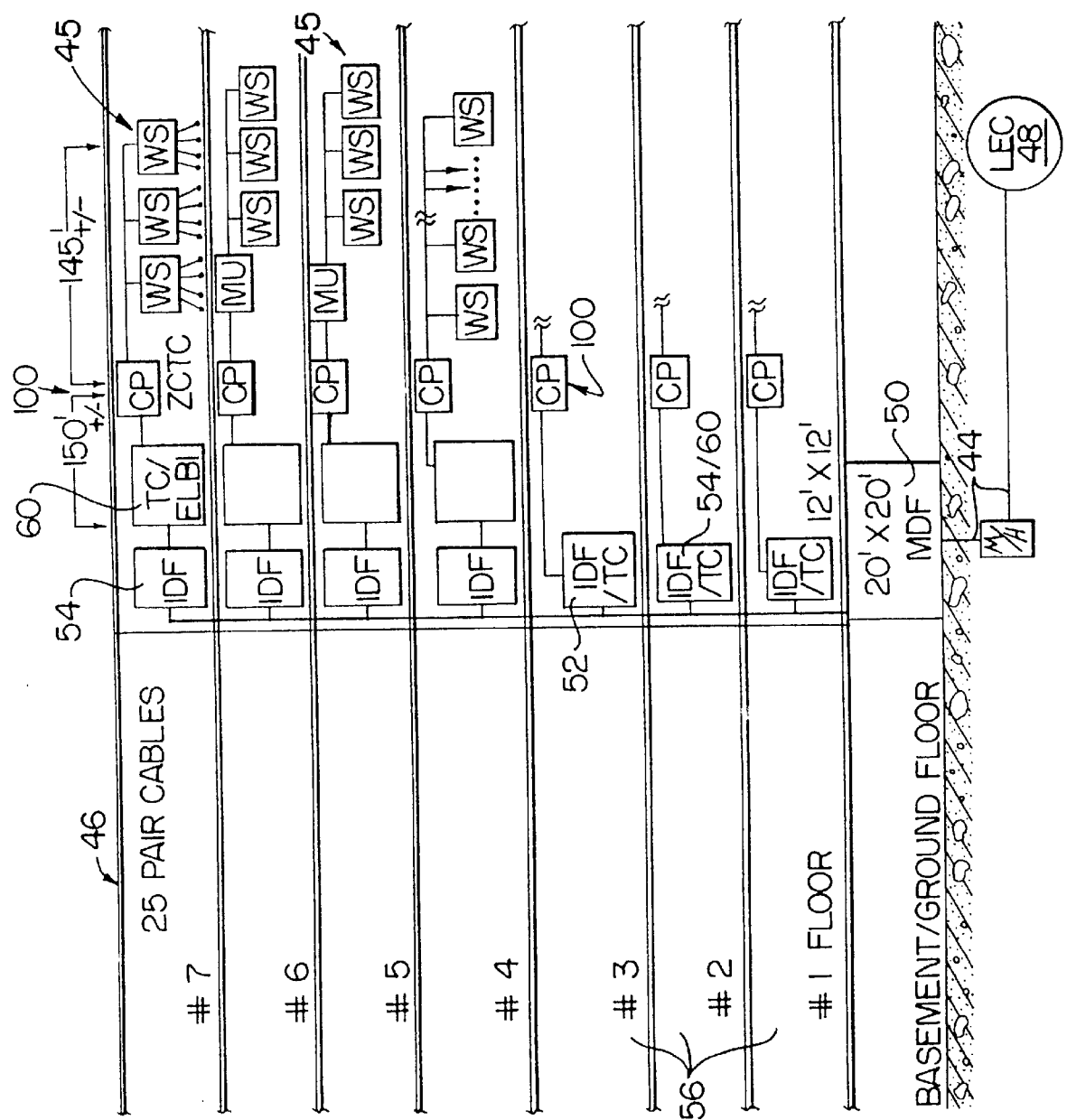
FIG. 4 is a diagrammatical elevational view of a building in cross-section illustrating a system of the present invention using the cabinet of FIG. 1.

For the present invention, and again with reference to FIG. 4, the cable routing is similar to that described with reference to FIG. 3, up and including the routing to the IDF 54. By using the above described cabinet 100 and cable routing methods, the size of the IDF 54 can be smaller than is typical for the art. Not as much floor space or storage space is required because the telecommunications equipment that is typically located within the IDF 54 and TC 60 can now be located within the cabinet 100 which can be located within an equipment room or as described herein by way of example, installed in the chamber 20 between the support ceiling 16 and drop ceiling 18 as was described with reference to FIG. 2.

As illustrated again with reference to FIG. 4, cable can be routed from the IDF 54 or TC 60 (depending on the building size and communication demands, the TC may be part of the IDF) to the cabinet 100 used as a consolidation point. The cabinet 100 becomes a "home run" location for multiple work stations (WS) 45. Now moves, additions and changes (MACs) can be completed at the cabinet 100 which places a consolidation point closer to the work stations 45 than typical in the art. Cable changes back to the IDF and TC are eliminated. With the use of twenty five conductive pair and optical fiber telecommunications cable between the TC 60 and the Cabinet 100 when used as a consolidation point, further enhances the efficiency and cost effectiveness of using the invention as herein described.

The cabinet 100 of the preferred embodiment, as herein described, is adapted to be installed between the drop ceiling 18 and support ceiling 16 as earlier described with reference to FIG. 2, and is accessible from below the ceiling 16 as after installation within a support grid 64 for ceiling tiles 66 of the suspended drop ceiling 18. Typically the ceiling tiles 66 will be made of a fire-resistant gypsum material.

Figure 5:
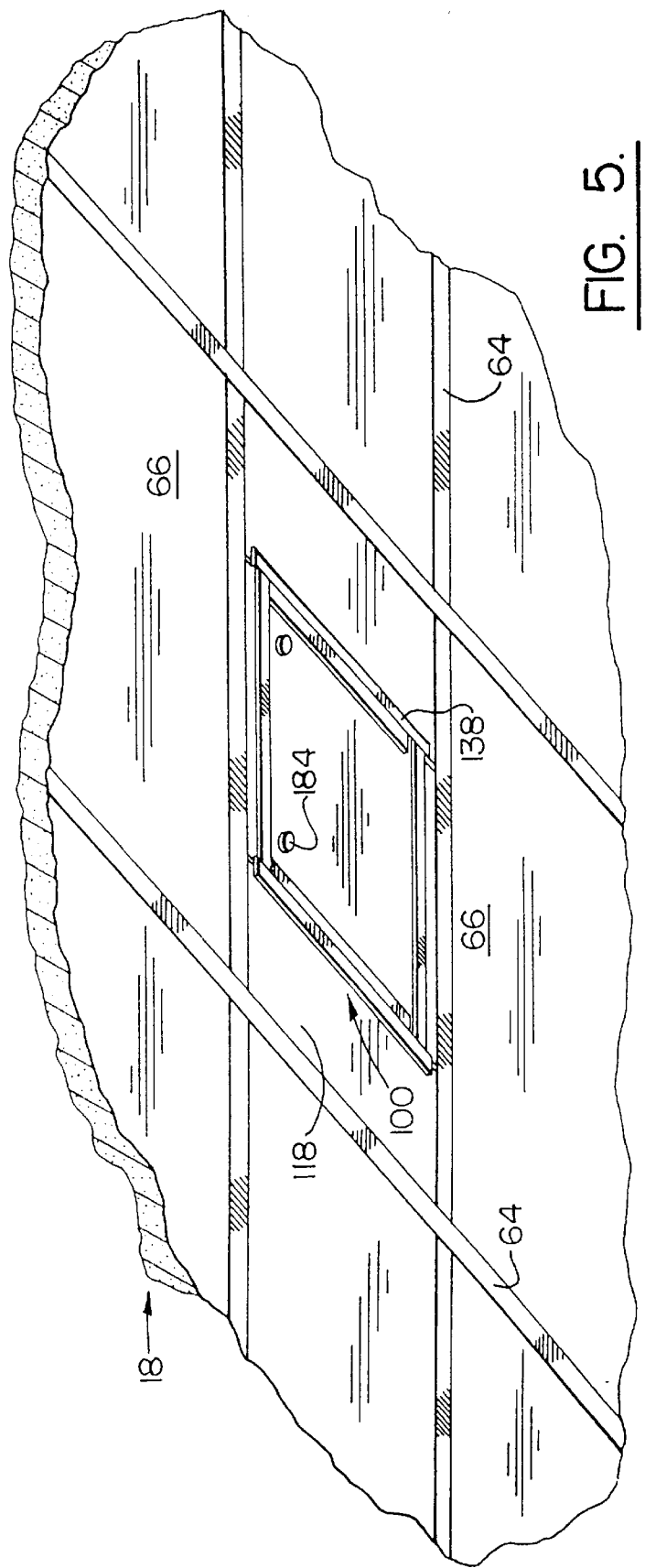
FIG. 5 is a perspective view the embodiment of FIG. 1 from below wherein the cabinet is installed within a suspended tile ceiling, its access panel in a closed position.

As illustrated again with reference to FIG. 1, the cabinet 100 in one preferred embodiment comprises a housing 104 having two pairs of opposing side walls 114a and 114b, and 114c and 114d; top wall 116, and bottom wall 118, which extends beyond the horizontal perimeter formed by the side walls 114a through 114d. All structural components of the housing 104 are preferably aluminum or steel, to meet fire code requirements. As illustrated with reference to FIG. 5, a length and width of the perimeter of bottom wall 118 should preferably match those of the ceiling tiles 66.

Figure 6:
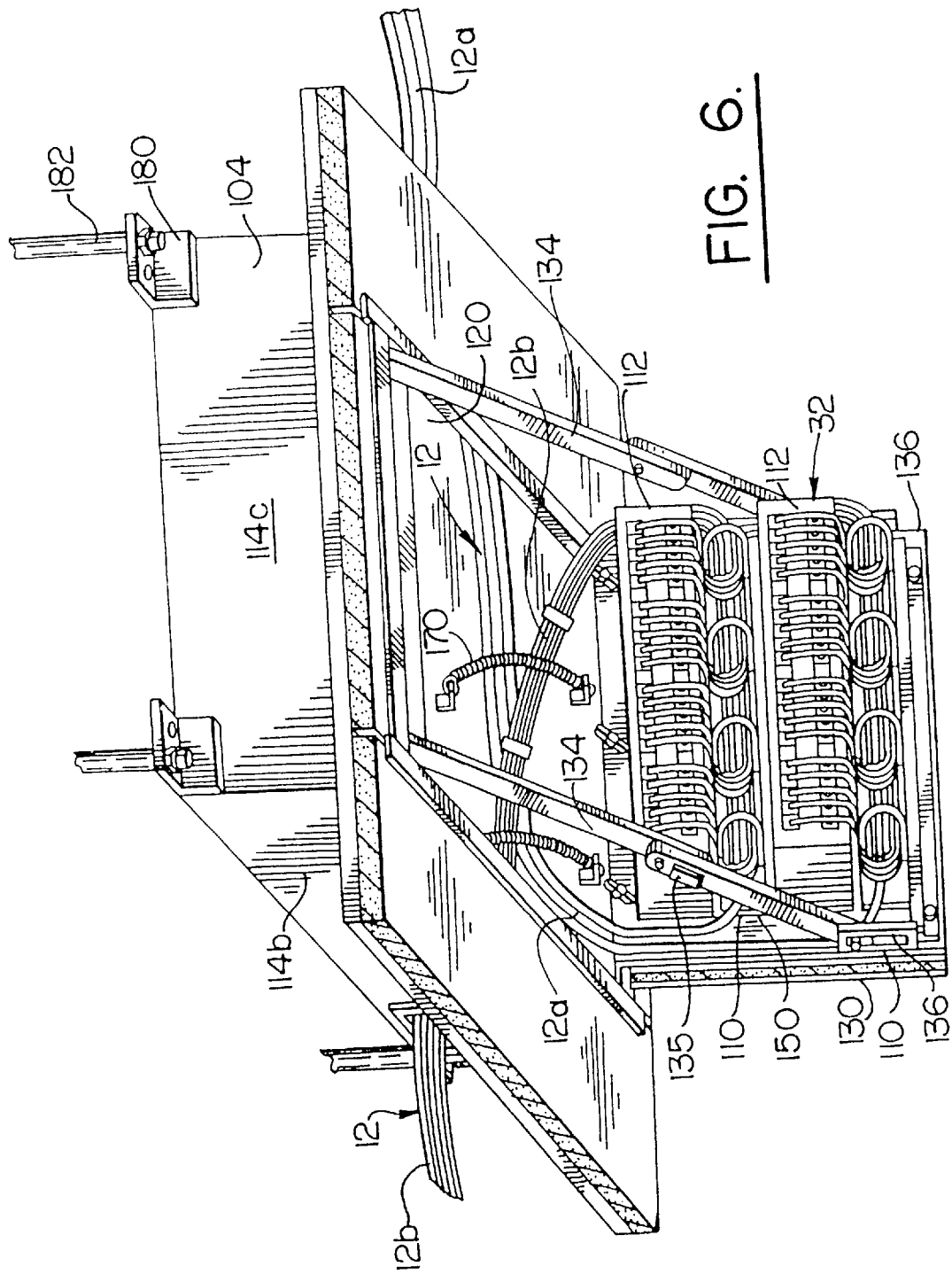
FIG. 6 is a perspective view of the interior of an embodiment of the cabinet of FIG. 1 with wiring installed on an equipment mounting plate.
Figure 7:
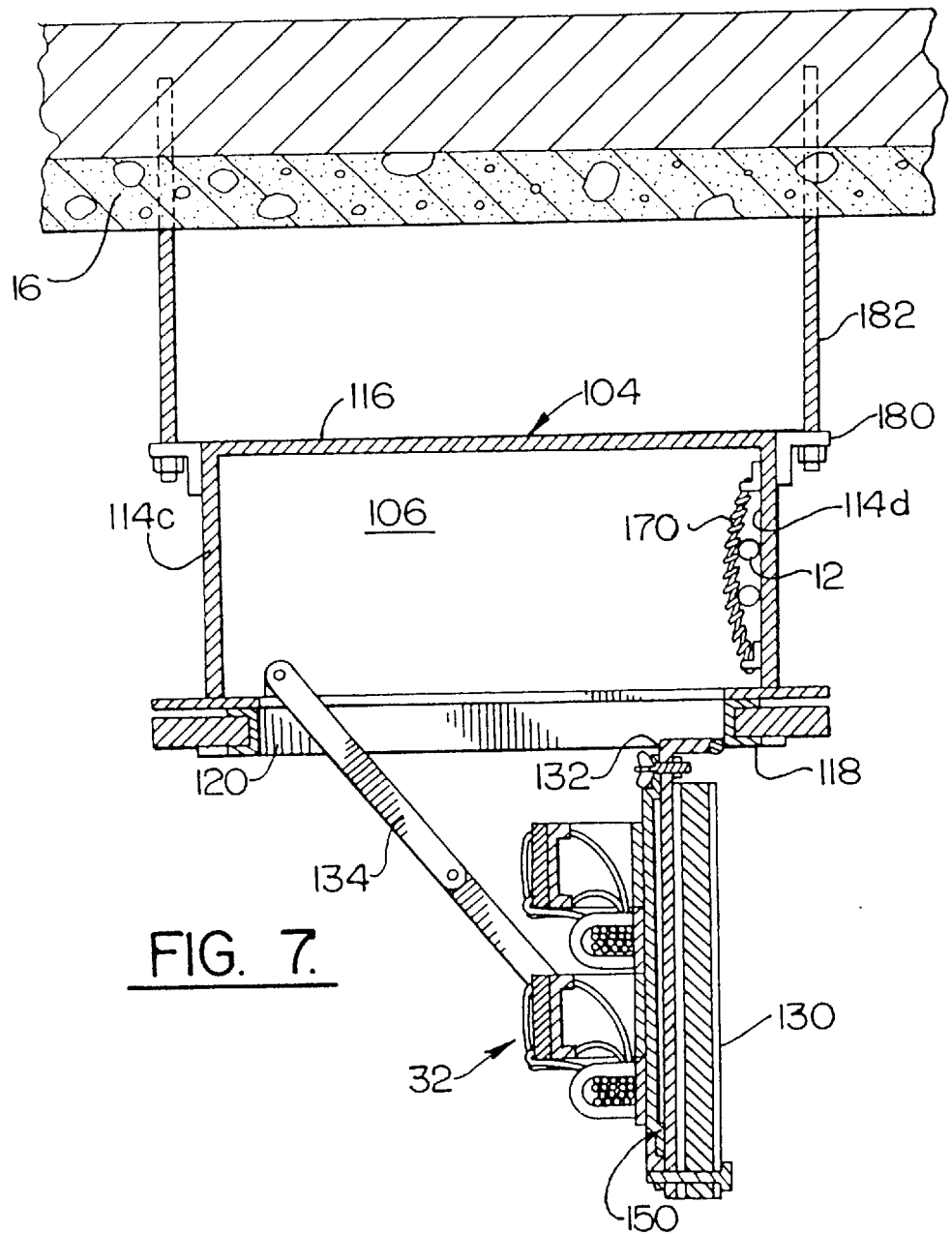
FIG. 7 is a vertical section taken along the line 8—8 of FIG. 1, with the access panel in its open position.
Figure 8:
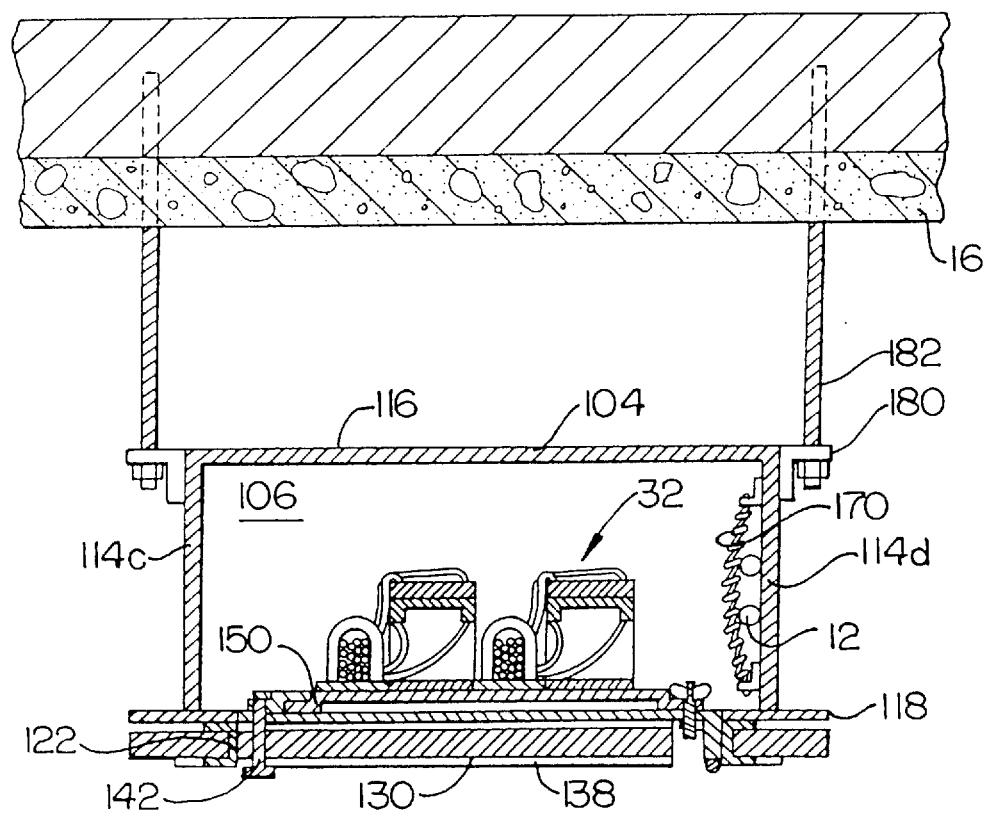
FIG. 8 is a vertical section taken along the line 8—8 of FIG. 1 with the access panel in a closed position.
Figure 10:
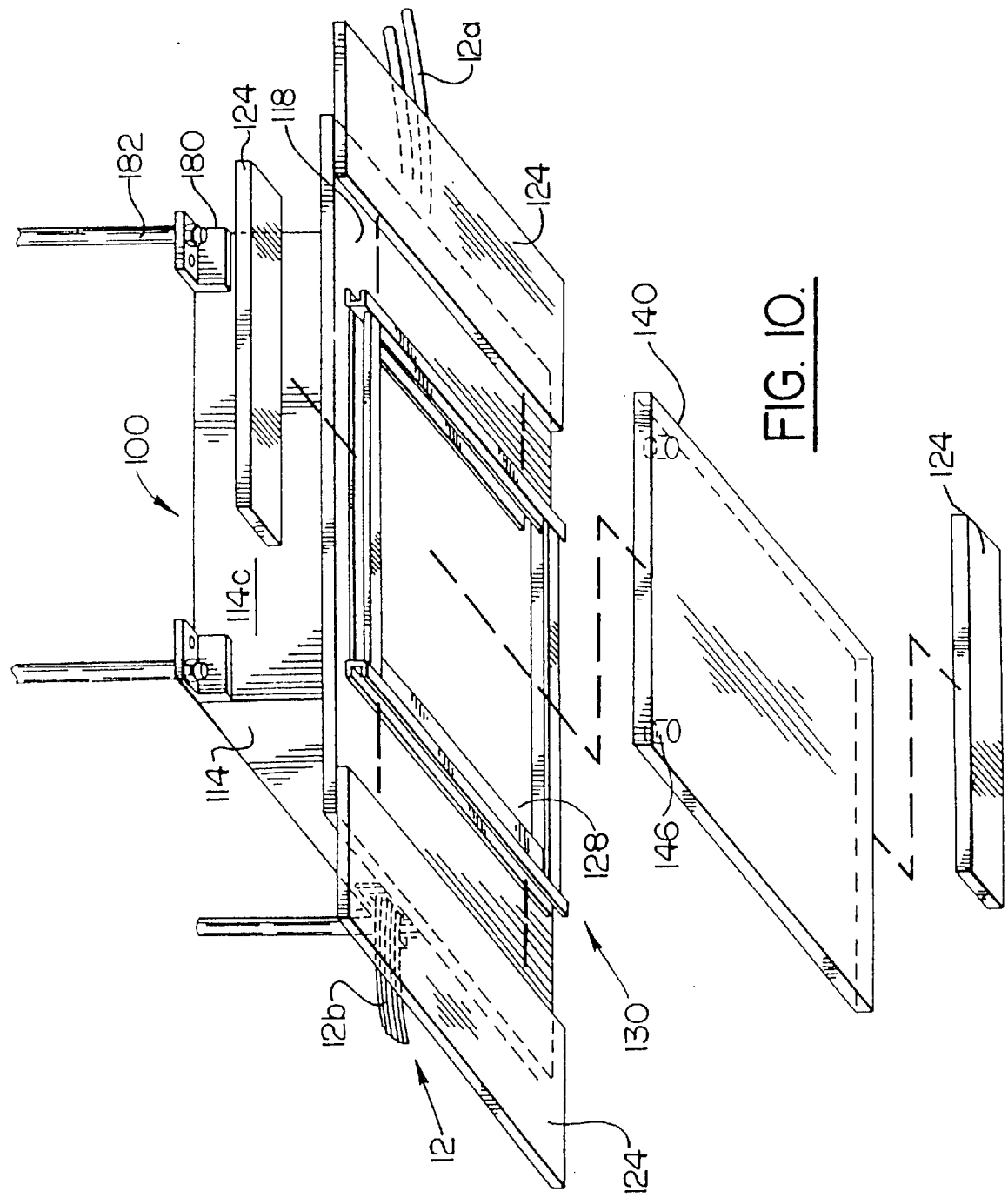
FIG. 10 is an exploded perspective view from below of the exterior of the cabinet of FIG. 1 illustrating insertion of ceiling tile pieces into flanges on the bottom wall.

As illustrated with reference to FIGS. 6–8, access to the interior 106 of the housing 104 is provided through an aperture or opening 120 through the bottom wall 118, herein depicted as being rectangular and more or less centered between support grids 64 as illustrated again with reference to FIG. 5. The edges of the aperture have attached thereto U-shaped flanges 122 to receive and retain ceiling tile material 124 as a cladding on the exterior lower surface of bottom wall 118, the material preferably being fire-resistant and presenting the same appearance as that of tiles 66, of the surrounding ceiling 18. As illustrated with reference to FIG. 10, an exploded perspective view of the cabinet 100 from below of the exterior of the cabinet 100 illustrates, by way of example, insertion of ceiling tile 66 into the flanges 122 on the bottom wall 118. Any conventional means of attachment of flanges 122 could be used, such as spot-welding. A removable access panel 128 fits and closes aperture 120. The preferred embodiment herein illustrated with reference to the drawings is a downward-opening door 130 attached to bottom wall 118 at one long side thereof to a matching side of opening 120 by a piano hinge 132, as illustrated with reference to FIGS. 7 and 8. The arcuate travel of door 130 pivoting on hinge 132 is controlled by a pair of conventional pivoting collapsible braces 134, attached at one end of each brace to bottom wall 118 at the short sides of opening 120 adjacent the non-hinge long side thereof, and attached at their opposite ends to the corresponding short sides of said door adjacent its non-hinged long side. The braces 134 obviously assist in providing additional support for door 130 to that provided by hinge 132. An optional stop 135 may be affixed to a brace 134 to prevent the door 30 from swinging open past a vertical orientation. The attachments of braces 134 to door 130 are made with conventional slotted brackets 136 to provide for sliding movement as well as pivoting movement. The door 130, like the exterior surface of bottom wall 118 adjacent opening 120, has a pair of U-shaped flanges 138 on its exterior surface adjacent the short sides thereof, the open ends of the U's facing each other, to removably receive cladding of ceiling tile material 140.

Figure 9:
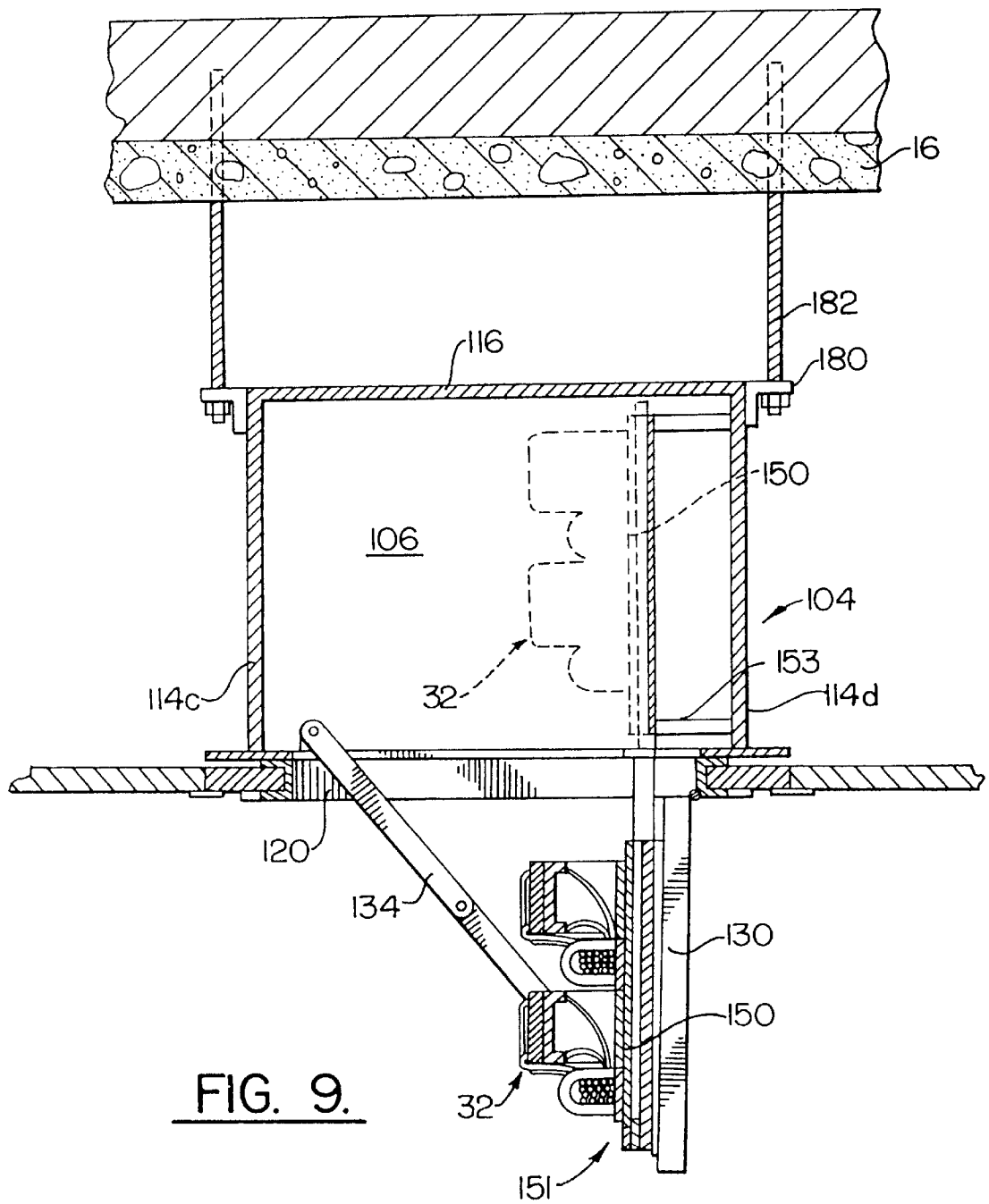
FIG. 9 is a vertical section taken along the line 8—8 of FIG. 1 for an alternate embodiment of the cabinet including a drawer styled assembly carrying the mounting plate and associated equipment.

In an alternate embodiment of the invention, and as illustrated with reference to FIG. 9, the equipment mounting plate 150 is slidably supported within the housing 104, wherein equipment supporting means 151 comprises the equipment mounting plate 150 slidably carried by the housing 104 on a drawer styled mounting 153. The equipment 32 is thus positioned within the enclosed space 106 while the door 130 is in the closed position and slidably outward from the enclosed space 106 through the opening 120 when the door 130 is in the open position. Various locking means could be used to lock the equipment supporting means in the door closed and door open positions. In addition, for heavy equipment 32, spring assisted means(not shown) are incorporated within the support means 151.

As illustrated with reference again to FIGS. 6, 7 and 8, are a pair of bolts 142, with hand-turnable heads or knobs 144, the bolts 142 inserted through apertures 146 in door 130 and through flange 148, described below, bolts 142 mating with nut means (not shown), affixed in a flange 149 mounted on the interior surface of bottom wall 118, overlapping the long edge of opening 120 opposite the piano-hinged edge.

Figure 12:
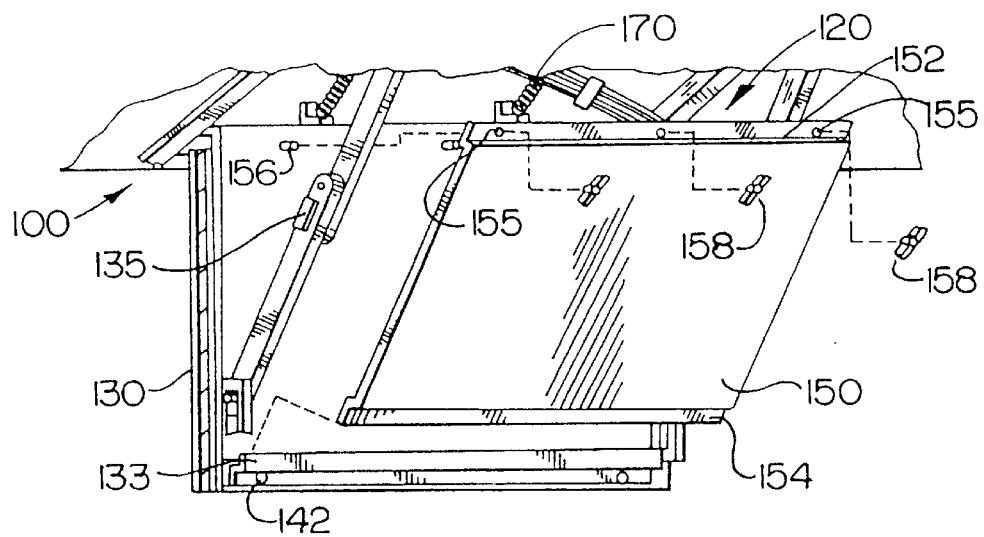
FIG. 12 is a detail exploded perspective view of the equipment mounting plate installed on the inside surface of the access door of the invention.

A pre-punched equipment mounting plate 150, illustrated without anything mounted to it in FIG. 12, is removably attached to the inside of door 130 in generally parallel relationship thereto. Plate 150 has L-shaped flanged top and bottom edges 152 and 154, respectively, which serve to keep all but the edges 152 and 154 spaced from door 130 to provide room for nuts, bolt heads, and the like that are used to fasten equipment 32, illustrated again with reference to FIGS. 6–8, to the plate 150, using pre-punched holes therein for insertion of fastening means. Flanged edges 152 and 154 also serve in attaching the plate 150 to the door 130. The door 130 has a Z-shaped flange 131 affixed to its interior surface parallel and proximate to its long non-hinged edge, which forms a channel 133 with door 130. Flange 154 fits into channel 133 and is supported by flange 131. Flange 152 has a plurality of apertures 155 situate for mating engagement with immovable bolts 156 affixed to the inside of door 130, and nuts 158 are used to secure the bolts in position through apertures 155.

Figure 11:
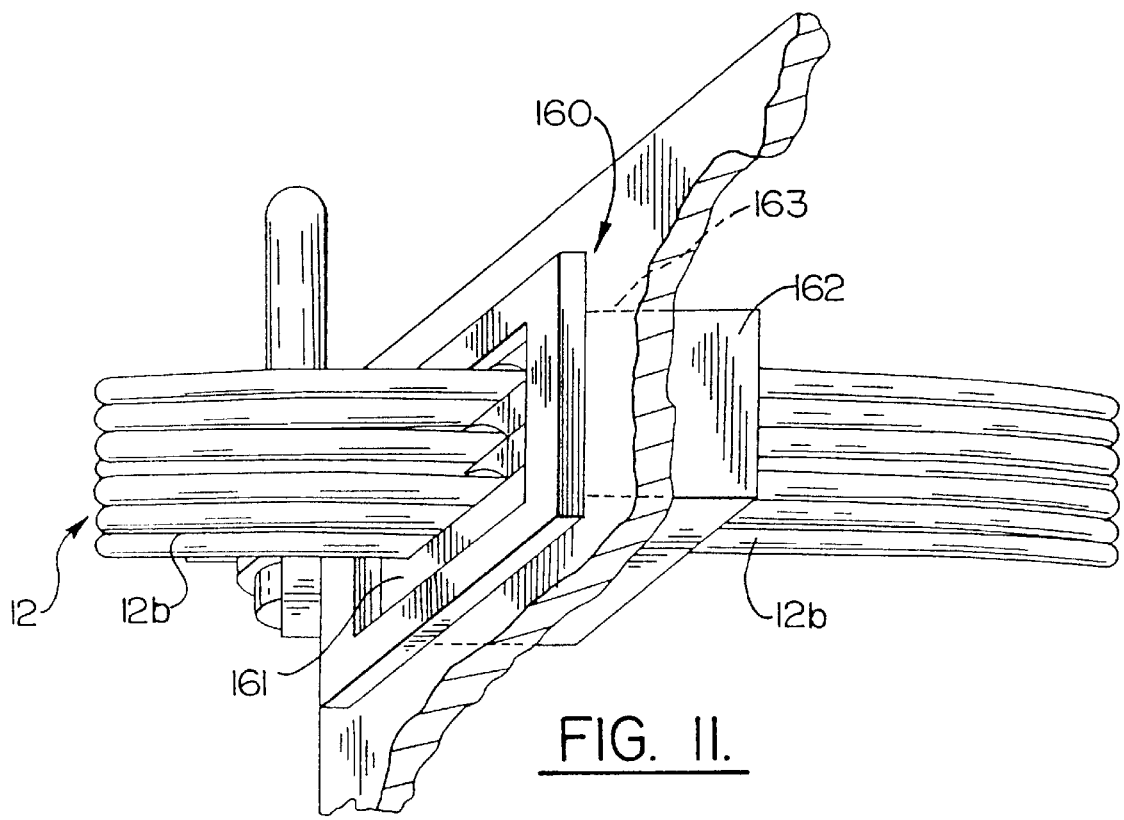
FIG. 11 is a detail perspective view of a fire-rated penetration for entry or exit of cables through a side wall of the cabinet of FIG. 1.

As further illustrated with reference again to FIGS. 6–8, the communications cabling and terminal equipment 32, illustrated by way of example, is mounted on the equipment mounting plate 150. Shown are wire management brackets 110, patch panels 112 and associated wiring for a typical voice phone EIA/TIA Category 3, 4 and 5 installation. Cables 12a and 12b, illustrated by way of example with reference again to FIG. 6, enter and exit the housing 104 through a pair of fire-resistant compression-type retrofit cable penetration frameworks 160 having rubber lining and fire-rated foam insulation and padding 161 surrounding cables 12a and 12b passing therethrough to and from the wire management brackets 110 on the mounting plate 150. As illustrated with reference to FIG. 11, a typical cabling penetration made by CSD Sealing Systems Inc., and approved by Underwriters Laboratories and CSA includes a frame 162 formed around a perimeter of a housing wall penetration 163. Multiple layers of the fire resistant insulation and padding 161 is positioned within the frame 162 for enclosing the penetration 163 and surrounding the cable 12 passing therethrough.

As illustrated with reference again to FIGS. 6–8, a pair of elastic spring-like retention means 170, attached at the ends thereof to the interior surface of rear side wall 114d of the housing 104, serve to lead and urge cables 12 against side wall 114d, so that they may bend and loop gradually, as required by applicable codes, toward the equipment mounting plate 150, rather than making right or acute angle turns if allowed to hang. Entering cables 12a are routed by the wired management brackets 110 to patch panels 112, by way of example, where they are punched down to appropriate category specifications. Exiting cables 12b, after leaving the equipment mounting plate 150, may be routed to a work station 14, as earlier described with reference to FIGS. 2 and 4, through standard partition poles or drop 40 extending between floor 24 and ceiling 18, or in the case of a partitioned office, through the between-wall space of the nearest wall to the work station area components 30.

As illustrated again with reference to FIGS. 2, 7 and 8, the a preferred embodiment of the cabinet 100 is supported from the true or support ceiling 16. Any conventional means of support could be used. The accompanying drawings show nut and thread rod anchoring assemblies 182, of appropriate strength, through bracket means 180 attached to, by way of example, opposing side walls 114c and 114d at corners thereof. When installed, with access door 130 in its closed position, the cladding of ceiling tile material 124 and 140 is flush with ceiling tiles 66.

Figure 13:
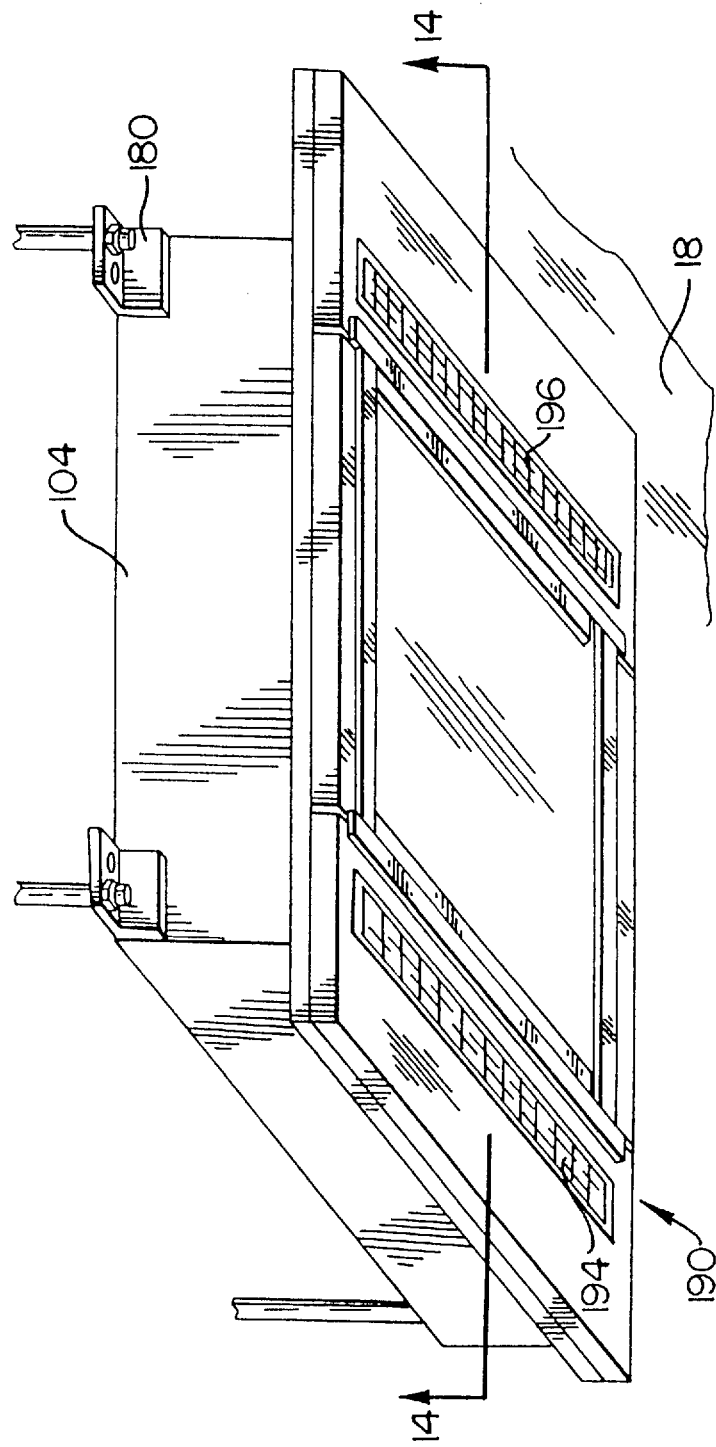
FIG. 13 is a perspective view of an alternate embodiment of the present invention, a telecommunications cable interconnection cabinet, from below showing an access panel and surrounding bottom wall faced with ceiling tile, wherein the cabinet includes inlet and outlet vents within bottom wall portions for circulation of work station room air through the cabinet.

As illustrated with reference to FIGS. 13 and 14, an alternate embodiment of the present invention further includes air circulation means 190 carried by the housing 104. The air circulation means 190 circulates exterior air 191 from outside 192 the housing 104 through the housing interior space 106. The exterior air 191 isolated from air 193 within the chamber 20 by the drop ceiling 18. In one preferred embodiment of the air circulation means 190, inlet and outlet ports 194, 196 are carried within the housing bottom wall 118. A fan 198 is positioned proximate the outlet port 196 for causing air flow through the interior space 106. A filter 199 is positioned in the air flow path proximate the inlet port 194 for filtering the air flowing into the housing interior space 104.

The invention presents an unobtrusive appearance from below and creates a fire-resistant enclosure, utilizing otherwise unused plenum space without the expense of plenum-rated materials, which can be installed in close proximity to the work station it serves, thereby saving space usable for other purposes. The decentralization of communications terminal and switching equipment facilitated by this invention means that the enclosure can be installed in the ceiling within a secure office, thereby providing access to the enclosed equipment only to the actual users thereof and their service providers. These characteristics thus secure the privacy of the enclosed equipment more so than if it were installed in a centralized IDF serving many users. The amount of cabling is greatly reduced by the shorter routing requirements provided by this system. The removable feature of the mounting plate makes it possible to perform changes, removal, additions, and repairs to the termination and switching means at a remote workbench or tabletop. This invention is suitable for all manner of communications cabling: wire; fiber; voice category 3, 4, and 5, DATA, CCTV, and CATV cabling, in individual user-defined zones throughout any building.

Many modifications and other embodiments of the invention will come to the mind of one skilled in the art having the benefit of the teachings presented in the foregoing descriptions and the associated drawings. The specific embodiment shown in the accompanying drawings and described herein is offered by way of illustration only. Therefore, it is to be understood that the invention is not to be limited to the specific embodiments disclosed, and that modifications and alternate embodiments are intended to be included within the scope of the appended claims.

What is claimed is:

1. An apparatus for interconnection of communications cables useful with an open office architecture in a building, the apparatus comprising;

a horizontally extending, generally planar support structure and a generally planar partition vertically spaced from the support structure forming a chamber therebetween, the planer partition separating the chamber from a work space and their respective environments;

a housing adapted for recessed installation within the chamber, the housing having walls defining an enclosed interior space and having fire resistant material for enclosing equipment carried therein and isolating the equipment from the environment within the chamber, the housing having an opening within one wall, the housing further having an access door hingedly attached thereto, the access door moveable between an open position and a closed position relative to the opening within the one wall for accessing the equipment from the work space, thus maintaining the equipment and the enclosed space only within the environment of the work space;

means for mounting the housing in a recessed installation within the chamber, wherein the housing one wall is generally co-planar with the planar partition for accessing the housing enclosed interior space from outside the chamber formed by the support structure and the partition;

communications cable and switching equipment;

means carried by the housing for supporting the communications cable termination and switching equipment, the supporting means positioning the equipment within the housing enclosed interior space when the door is in the closed position, the supporting means permitting positioning of the equipment outside of the enclosed interior space when the door is in the open position for permitting servicing of the equipment;

means for penetrating a housing wall positioned within the chamber, the penetrating means adapted for entry and exit of a communications cable passing into and out of the housing interior space, to and from the equipment, the penetrating means including an aperture and fire resistant insulation enclosing the aperture while receiving the cable passing therethrough; and a communications cable extending generally horizontally within the chamber, the cable received by the penetration means for electrical connection of the cable with the equipment.

2. The apparatus according to claim 1, wherein the planar partition comprises a drop ceiling formed above a room having a controlled environment, the partition isolating the room environment from a chamber environment.

3. The apparatus according to claim 1, wherein the planar partition comprises a raised floor for a room formed above a structural floor, the room having a controlled environment, the partition isolating the room environment from a chamber environment.

4. The apparatus according to claim 1, further comprising latching means for holding the door in the open position at an angle generally perpendicular to the one wall.

5. The apparatus according to claim 1, wherein the housing mounting means comprises support means for anchoring the housing to the support structure.

6. The apparatus according to claim 1, wherein the equipment supporting means comprises an equipment mounting plate attached to the door for the equipment positioning within the enclosed space while the door is in the closed position and for the equipment positioning outside the enclosed space when the door is in the open position.

7. The apparatus according to claim 6, wherein the mounting plate is removably attached to the door.

8. The apparatus according to claim 1, wherein the equipment supporting means comprises an equipment mounting plate slidably carried by the housing, the equipment positioning within the enclosed space while the door is in the closed position and slidably outward from the enclosed space through the opening when the door is in the open position.

9. The apparatus according to claim 1, wherein the equipment comprises a cross-connection for a multi-user telecommunications outlet, thus facilitating termination of a cable routed to the housing through a building horizontal pathway in the chamber, the multi-user outlet providing access to user telecommunications equipment.

10. The apparatus according to claim 1, wherein the equipment comprises multiple connectors for providing a consolidation point for telecommunications cable routed from a building pathway through horizontal pathway in the chamber.

11. The apparatus according to claim 1, wherein the housing wall penetrating means comprises:

a frame formed around the aperture; and the insulation including multiple layers of the insulation and padding positioned within the frame, the multiple layers enclosing the aperture, wherein the insulation and the padding surround the cable passing through the aperture.

12. The apparatus according to claim 1, wherein the communication cable comprises twenty five conductive pair telecommunications cable.

13. The apparatus according to claim 1, wherein the communications cable comprises optical fiber cable.

14. The apparatus according to claim 1, further comprising air circulation means carried by the housing, the air circulation means circulating exterior air from outside the housing through the housing interior space, the exterior air isolated from air within the chamber by the planar partition.

15. The apparatus according to claim 14, wherein the air circulation means comprises:

inlet and outlet ports carried within the housing one wall;

a fan carried by the housing, the fan positioned for causing air flow through one port; and a filter positioned for filtering the air flowing into the housing interior space.

means for penetrating a housing wall positioned within the chamber, the penetrating means adapted for entry and exit of a communications cable passing into and out of the housing interior space.

16. An apparatus useful with a building open office architecture having interconnection of communications cable routed within a chamber formed between a generally planar support structure and a generally planar partition vertically spaced from the support structure, the apparatus comprising:

a housing adapted for recessed installation within a chamber formed between a support structure and a generally planar partition vertically spaced from the support structure, the planar partition separating the chamber from a work space and their respective environments, the housing having walls defining an enclosed interior space having fire resistant material for enclosing equipment and cable carried therein and isolating them from the environment within the chamber, and an opening within one wall for accessing the enclosed interior space therethrough, the housing further having an access door movably attached thereto, the access door moveable between an open position and a closed position relative to the opening within the one wall for accessing the equipment from the work space thus maintaining the equipment and the enclosed space only within the environment of the work space;

means for mounting the housing in a recessed installation within the chamber, wherein the housing one wall is generally co-planar with the planar partition for accessing the housing enclosed interior space from outside the chamber formed by the support structure and the partition;

means carried by the housing for supporting communications cable termination and switching equipment, the supporting means positioning the equipment within the housing enclosed interior space when the door is in the closed position, the supporting means permitting positioning of the equipment outside of the enclosed interior space when the door is in the open position for permitting servicing of the equipment; and means for penetrating a housing wall positioned within the chamber, the penetrating means adapted for entry and exit of a communications cable passing into and out of the housing interior space through an aperture and fire resistant insulation enclosing the aperture while receiving the cable passing therethrough.

17. The apparatus according to claim 16, wherein the planar partition comprises a drop ceiling formed above a room having a controlled environment, the partition isolating the room environment from a chamber environment.

18. The apparatus according to claim 16, wherein the planar partition comprises a raised floor for a room formed above a structural floor, the room having a controlled environment, the partition isolating the room environment from a chamber environment.

19. The apparatus according to claim 16, further comprising latching means for holding the door in the open position at an angle generally perpendicular to the one wall.

20. The apparatus according to claim 16, wherein the housing mounting means comprises support means for anchoring the housing to the support structure.

21. The apparatus according to claim 16, wherein the equipment supporting means comprises an equipment mounting plate removably attached to the door for the equipment positioning within the enclosed space while the door is in the closed position and for the equipment positioning outside the enclosed space when the door is in the open position.

22. The apparatus according to claim 16, wherein the equipment supporting means comprises an equipment mounting plate slidably carried by the housing, the equipment positioning within the enclosed space while the door is in the closed position and slidably outward from the enclosed space through the opening when the door is in the open position.

23. The apparatus according to claim 16 further, comprising communication cable and switching equipment having a cross-connection for a multi-user telecommunications outlet, thus facilitating termination of a cable routed to the housing through a building horizontal pathway in the chamber, the multi-user outlet providing access to user telecommunications equipment.

24. The apparatus according to claim 16, further comprising communication cable and switching equipment having multiple connectors for providing a consolidation point for telecommunications cable routed from a building pathway through horizontal pathway in the chamber.

25. The apparatus according to claim 16, wherein the housing wall penetrating means comprises:

a frame formed around the aperture; and the insulation having multiple layers of the insulation and padding positioned within the frame, the multiple layers enclosing the aperture, wherein the insulation and the padding surround the cable passing through the aperture.

26. The apparatus according to claim 16, further comprising air circulation means carried by the housing, the air circulation means circulating exterior air from outside the housing through the housing interior space, the exterior air isolated from air within the chamber by the planar partition.

27. The apparatus according to claim 26, wherein the air circulation means comprises:

inlet and outlet ports carried within the housing one wall;

a fan carried by the housing, the fan positioned for causing air flow through one port; and a filter positioned for filtering the air flowing into the housing interior space.

28. An apparatus useful with a building open office architecture having interconnection of communications cable routed within a chamber formed between a support ceiling and a drop ceiling vertically spaced from the support ceiling for interconnection of communications cables useful with a building open office architecture, the apparatus comprising:

a housing adapted for recessed installation within a chamber formed between a horizontally extending, generally planar support ceiling and a generally planar drop ceiling vertically spaced from the support ceiling, the planar drop ceiling separating the chamber from a work space and their respective environments, the housing having bottom, top and side walls defining an enclosed interior space having fire resistant material for enclosing equipment carried therein and isolating the equipment from the environment within the chamber, the housing having an opening within the bottom wall, the housing further having an access door hingedly attached thereto for movement between an open position and a closed position relative to the opening within the bottom wall for accessing the equipment from the work space, thus maintaining the equipment and the enclosed space only within the environment of the work space;

means for mounting the housing in a recessed installation within the chamber, wherein the housing bottom wall is generally co-planar with the drop ceiling for accessing the housing enclosed interior space from below the drop ceiling;

means carried by the housing for supporting communications cable termination and switching equipment, the supporting means positioning the equipment within the housing enclosed interior space when the door is in the closed position, the supporting means permitting positioning of the equipment outside of the enclosed interior space when the door is in the open position for permitting servicing of the equipment from below the drop ceiling; and means for penetrating a housing side wall positioned within the chamber, the penetrating means adapted for entry and exit of a communications cable through the side wall, to and from the equipment, the penetrating means including an aperture and fire resistant insulation enclosing the aperture while receiving the cable passing therethrough.

29. The apparatus according to claim 28, wherein the housing mounting means comprises anchor bolts penetrating the support ceiling for supporting the housing within the chamber.

30. The apparatus according to claim 28, wherein the equipment supporting means comprises an equipment mounting plate removably attached to the door for the equipment positioning within the enclosed space while the door is in the closed position and for the equipment positioning outside the enclosed space and below the drop ceiling when the door is in the open position.

31. The apparatus according to claim 28, wherein the equipment supporting means comprises an equipment mounting plate slidably carried by the housing, the equipment positioning within the enclosed space while the door is in the closed position and slidably outward the housing and below the drop ceiling when the door is in the open position.

32. The apparatus according to claim 28, wherein the housing wall penetrating means comprises:

a frame formed around the aperture; and the insulation having multiple layers of the insulation and padding positioned within the frame, the multiple layers enclosing the aperture, wherein the insulation and padding surround the cable passing through the aperture.

33. The apparatus according to claim 28, further comprising air circulation means carried by the housing, the air circulation means circulating air from outside the housing and below the ceiling through the housing interior space.

adapting the housing for penetrating the housing with the cable for entry and exit of the communications cable into and out of the housing interior space, to and from the equipment.

34. A method for routing communications cable and for providing cable interconnection for multiple work stations within a work space of a building having a support structure and a generally planar partition vertically spaced from the support structure for forming a chamber for horizontally routing the communications cable from building cable pathways to work stations in an open office architecture, the planar partition separating the chamber from the work space and separating their respective environments, the method comprising the steps of:

providing a housing adapted for recessed installation within a chamber formed between a structural support and a partition vertically spaced from the structural support, the housing having walls defining an enclosed interior space and fire resistant material for enclosing equipment carried therein and isolating the equipment from the environment within the chamber, the housing further having an opening within one wall and an access door hingedly attached thereto, the access door moveable between an open position and a closed position relative to the opening within the one wall;

mounting the housing in a recessed installation within the chamber, wherein the housing one wall is generally co-planar with the planar partition for accessing the housing enclosed interior space from outside the chamber formed by the support structure and the partition;

providing communications cable and switching equipment;

supporting the equipment within the housing enclosed interior space;

routing communications cable to the housing;

penetrating the housing with the communications cable for entry and exit of the communications cable into and out of the housing interior space, to and from the equipment through an aperture within the housing wall, while enclosing the aperture with fire resistant insulation receiving the cable therethrough; and accessing the equipment from the work space while maintaining the equipment and the enclosed space within the environment of the work space.

35. The method according to claim 34, wherein the planar partition comprises a drop ceiling formed above a room having a controlled environment, the partition isolating the room environment from a chamber environment.

36. The method according to claim 34, wherein the planar partition comprises a raised floor for a room formed above a structural floor, the room having a controlled environment, the partition isolating the room environment from a chamber environment.

37. The method according to claim 34, further comprising the step of latching the door in the open position at an angle generally perpendicular to the one wall for servicing the equipment.

38. The method according to claim 34, wherein the housing mounting step comprises the step of anchoring the housing to the support structure.

39. The method according to claim 34, wherein the equipment supporting step comprises the step of removably attaching a mounting plate to the door for supporting the equipment within the enclosed space while the door is in the closed position and for moving the equipment outside the enclosed space when the door is in the open position.

40. The method according to claim 34, wherein the equipment supporting step comprises the step of slidably attaching an equipment mounting plate to the housing for supporting the equipment within the housing while the door is in the closed position and moving the equipment slidably outward from the enclosed space through the opening when the door is in the open position.

41. The method according to claim 34, further comprising the step of providing a cross-connection for a multi-user telecommunications outlet, thus facilitating termination of a cable routed to the housing through a building horizontal pathway in the chamber, the multi-user outlet providing access to user telecommunications equipment.

42. The method according to claim 34, further comprising the step of providing equipment having multiple connectors for providing a consolidation point for telecommunications cable routed from a building pathway through horizontal pathway in the chamber.

43. The method according to claim 34, further comprising the steps of circulating air from outside the housing through the housing interior space and isolating the air from air within the chamber.

44. A method for routing communications cable and for providing cable interconnection for multiple work stations within a work space of a building having a support ceiling and a drop ceiling vertically spaced from the support ceiling forming a chamber for routing the communications cable between the ceilings from building cable pathways to work stations, the drop ceiling separating the chamber from the work space and separating their respective environments, the method comprising the steps of:

providing a plurality of housings having an enclosed interior space and adapted for installation within the chamber between the support ceiling and the drop ceiling vertically spaced from the support ceiling, each housing having an opening within a bottom wall and an access door hingedly attached thereto for access into the housing through the opening with the door in an open position while maintaining the equipment and th eenclosed interior space within the environment of the work space;

mounting communications cable and switching equipment within each of the plurality of housings for providing cable terminations within each housing;

mounting each of the plurality of housings within the chamber between the support ceiling and the drop ceiling in a recessed installation from the drop ceiling, wherein the housing door for each of the plurality of housings is generally co-planar with the drop ceiling for accessing the enclosed interior space from below the drop ceiling for each of the plurality of housings;

routing communications cable to each of the plurality of housings;

penetrating each of the plurality of housings with the communications cable for entry and exit of the communications cable into and out their respective enclosed interior space, to and from the equipment through an aperture within the housing wall while enclosing the aperture with fire resistant insulation receiving the cable therethrough; and accessing the equipment from the work space while maintaining the equipment and the enclosed space within the environment of the work space.

45. The method according to claim 44, further comprising the step of latching the door in an open position servicing the equipment.

46. The method according to claim 44, wherein the housing mounting step comprises the step of anchoring the housing to the support ceiling.

47. The method according to claim 44, wherein the equipment mounting step comprises the step of removably attaching a mounting plate to each door for supporting the equipment within each enclosed space while the door is in a closed position and for moving the equipment outside the enclosed space when each door is in the open position.

48. The method according to claim 44, wherein the equipment mounting step comprises the step of slidably attaching an equipment mounting plate to the housing for supporting the equipment within the housing while the door is in a closed position and moving the equipment slidably outward from the enclosed space through the opening when the door is in the open position.

49. The method according to claim 44, further comprising the step of providing a cross-connection for a multi-user telecommunications outlet, thus facilitating termination of a cable routed to the housing through a building horizontal pathway in the chamber, the multi-user outlet providing access to user telecommunications equipment.

50. The method according to claim 44, further comprising the step of providing equipment having multiple connectors for providing a consolidation point for telecommunications cable routed from a building pathway through horizontal pathway in the chamber.

51. The method according to claim 44, further comprising the step of circulating air from below the ceiling through the housing interior space for isolating the circulated air from air between the ceilings.

* * * * *